(12) United States Patent
Kuckuk et al.

(10) Patent No.: US 12,200,043 B2
(45) Date of Patent: Jan. 14, 2025

(54) SYSTEMS AND METHODS FOR WIRELESS NETWORKING IN A BUILDING NETWORK

(71) Applicant: Johnson Controls Tyco IP Holdings LLP, Milwaukee, WI (US)

(72) Inventors: William R. Kuckuk, Hubertus, WI (US); Christopher J. McCann, West Bend, WI (US); Nathan M. Zimmerman, Wauwatosa, WI (US); Kim K. Weller, Mukwonago, WI (US); Nick J. Schaf, Hartland, WI (US)

(73) Assignee: Johnson Controls Tyco IP Holdings LLP

( * ) Notice: Subject to any disclaimer, the term of this patent is extended or adjusted under 35 U.S.C. 154(b) by 178 days.

(21) Appl. No.: 17/374,135

(22) Filed: Jul. 13, 2021

(65) Prior Publication Data
US 2023/0013555 A1    Jan. 19, 2023

(51) Int. Cl.
| F24F 11/56 | (2018.01) |
| F24F 11/30 | (2018.01) |
| H04L 67/10 | (2022.01) |
| H04L 67/12 | (2022.01) |
| H04W 84/18 | (2009.01) |

(52) U.S. Cl.
CPC ............ *H04L 67/10* (2013.01); *F24F 11/30* (2018.01); *F24F 11/56* (2018.01); *H04L 67/12* (2013.01); *H04W 84/18* (2013.01)

(58) Field of Classification Search
CPC .......... H04L 67/10; H04L 67/12; F24F 11/30; F24F 11/56; H04W 84/18
See application file for complete search history.

(56) References Cited

U.S. PATENT DOCUMENTS

| 7,643,891 B2 | 1/2010 | Rule et al. |
| 7,835,372 B2 | 11/2010 | Wang et al. |
| 10,628,135 B2 | 4/2020 | Sharma et al. |
| 10,746,428 B2 | 8/2020 | Przybylski et al. |
| 10,831,163 B2 | 11/2020 | Park |
| 10,868,857 B2 | 12/2020 | Park et al. |
| 10,880,107 B2 | 12/2020 | Gamroth et al. |

(Continued)

FOREIGN PATENT DOCUMENTS

| CA | 3108929 C | 7/2021 |
| CA | 3154167 A1 | 7/2021 |
| WO | WO-2022/171730 A1 | 8/2022 |

OTHER PUBLICATIONS

U.S. Appl. No. 17/374,135, filed Jul. 13, 2021, Johnson Controls Building Efficiency Products.

(Continued)

*Primary Examiner* — Charles R Kasenge
(74) *Attorney, Agent, or Firm* — Foley & Lardner LLP

(57) ABSTRACT

A bridge device for a building network includes a radio, a wired communications interface configured to communicate with a first master slave/token passing (MS/TP) network, and a processing circuit configured to wirelessly transmit and receive messages to and from MS/TP devices coupled to the MS/TP network. The processing circuit is configured to transparently communicate the messages such that the MS/TP devices on the first MS/TP network are operationally unaware of a wireless network associated with the bridge device by passing tokens for MS/TP devices outside of the MS/TP network.

20 Claims, 7 Drawing Sheets

(56) References Cited

U.S. PATENT DOCUMENTS

| | | | |
|---|---|---|---|
| 11,307,538 B2 | 4/2022 | Park et al. | |
| 11,385,605 B2 | 7/2022 | Wenzel et al. | |
| 11,625,018 B2 | 4/2023 | Krishnan et al. | |
| 2006/0274745 A1* | 12/2006 | Wang | H04W 88/16 370/389 |
| 2009/0312853 A1* | 12/2009 | Kore | G05B 19/4185 700/90 |
| 2011/0317548 A1* | 12/2011 | Pustylnik | H04L 43/0811 370/244 |
| 2013/0238144 A1 | 9/2013 | Shahapurkar et al. | |
| 2014/0207290 A1* | 7/2014 | Crawford | G05D 23/1917 700/276 |
| 2016/0327296 A1 | 11/2016 | Leising et al. | |
| 2017/0353245 A1* | 12/2017 | Vardarajan | H04W 16/20 |
| 2018/0232422 A1 | 8/2018 | Park et al. | |
| 2018/0232423 A1 | 8/2018 | Park et al. | |
| 2018/0232459 A1 | 8/2018 | Park et al. | |
| 2019/0163215 A1 | 5/2019 | Cheng et al. | |
| 2020/0050161 A1 | 2/2020 | Noboa | |
| 2020/0133978 A1 | 4/2020 | Ramamurti et al. | |
| 2020/0183660 A1 | 6/2020 | Lucas et al. | |
| 2020/0228621 A1 | 7/2020 | Gamroth et al. | |
| 2020/0233657 A1 | 7/2020 | Duraisingh et al. | |
| 2020/0327371 A1 | 10/2020 | Sharma et al. | |
| 2021/0191826 A1 | 6/2021 | Duraisingh et al. | |
| 2021/0200807 A1 | 7/2021 | Ploegert et al. | |
| 2021/0232369 A1 | 7/2021 | Sharma et al. | |
| 2021/0326128 A1 | 10/2021 | Malladi et al. | |
| 2021/0373509 A1 | 12/2021 | Borah et al. | |
| 2021/0373510 A1 | 12/2021 | Borah et al. | |
| 2021/0382449 A1 | 12/2021 | Krishnan et al. | |
| 2021/0382451 A1 | 12/2021 | Bharathi et al. | |
| 2021/0382474 A1 | 12/2021 | Krishnan et al. | |
| 2022/0018567 A1 | 1/2022 | Ock et al. | |
| 2022/0092500 A1 | 3/2022 | Drees et al. | |
| 2022/0137936 A1 | 5/2022 | Lucas et al. | |
| 2022/0377132 A1 | 11/2022 | Gupta et al. | |
| 2023/0367559 A1 | 11/2023 | Sharma et al. | |

OTHER PUBLICATIONS

Press Release, "The new W-BACnet from Lumen Radio—an unparalleled wireless BACnet solution driving cost—and time savings for building automation," https://lumenradio.com/stories/the-new-w-bacnet-from-lumenradio-an-unparalleled-wireless-bacnet-solution-driving-cost-and-time-savings-for- building-automation/. Jan. 24, 2022 (5 pages).

Legrand, "Wattstopper—Wireless BACnet MS/TP Bridge," Catalog No. WBT900, No. 25174-2/17 rev. 1 (4 pages).

Luo et al., "Towards a Wireless Building Management System Requiring No. Change to Upper-layer Protocols," The Hong Kong Polytechnic University, Harbin Institute of Technology, Building Integration Perfection Ltd., Nanchang University Jul. 30, 2012 (12 pages).

U.S. Appl. No. 18/215,990, filed Jun. 29, 2023, Bari, Prasanna Manohar.

* cited by examiner

SYSTEMS AND METHODS FOR WIRELESS NETWORKING IN A BUILDING NETWORK

CROSS-REFERENCE TO RELATED PATENT APPLICATIONS

This application is related to U.S. Pat. No. 10,880,107 and U.S. patent application Ser. No. 16/740,279, filed Jan. 10, 2020, both of which are incorporated herein by reference in their entireties.

BACKGROUND

The present disclosure relates generally to building networks for monitoring and controlling building equipment in or around a building. More specifically, the present disclosure relates to systems and methods for wirelessly communicating in a building network.

In a building, various pieces of building equipment (e.g., HVAC equipment, lighting equipment, security equipment, etc.) can communicate via a network within the building. The network may be a wired network, such a building automation and control network (BACnet) network. Pulling communication cable for a wired network through a building adds to the labor expense when installing building equipment. In retrofit scenarios, pulling new communication cable can be even more difficult or damaging to the building.

SUMMARY

A building network system for a building including wireless bridge devices forming a multi-point-to-multi-point network for the building. The first wireless bridge device of the wireless bridge devices includes a radio, a wired communications interface configured to communicate with a first building automation control network master slave/token passing (BACnet MS/TP) device connected to the first wireless bridge device; and a processing circuit. The processing circuit is configured to provide wireless communications to and from the first BACnet MS/TP device and a second BACnet IP device such that the first BACnet MS/TP device and the second BACnet MS/TP device are operationally unaware of the wireless communications. The wireless communications are master to master communications.

One implementation of the present disclosure is related to a method. The method includes providing a first message from a first building automation and control network master slave token passing (BACnet MS/TP) device via wired communication on a first BACnet network segment to a first wireless bridge device. The first message is for a second BACnet device in wired communication with a second wireless bridge device. The method also includes providing the first message from the first wireless bridge device to the second wireless bridge device via direct or indirect wireless communication and providing the first message from the second wireless bridge device to the second BACnet MS/TP device. The first BACnet MS/TP device and the second BACnet MS/TP device are operationally unaware of the wireless communications and the first BACnet MS/TP device and the second BACnet MS/TP device are master devices. The first wireless bridge device and the second wireless bridge device are part of multi-point to multi-point network One implementation of the present disclosure is related to a wireless bridge device for a building network including a plurality of bridge devices forming a wireless system and building automation and control network master slave/token passing (BACnet MS/TP) network segments comprising BACnet MS/TP devices. The wireless bridge device includes a wired communications interface configured to communicate with a first BACnet MS/TP device connected to the first wireless bridge device. The wireless bridge device also includes a processing circuit configured to wirelessly transmit and receive messages to and from BACnet MS/TP devices. The processing circuit is configured to transparently communicate the messages such that the BACnet MS/TP devices are operationally unaware of the wireless bridge system and is configured to participate multi-point-to-multi-point network.

One implementation of the present disclosure is related to a building network system for a building. The building network system includes wireless bridge devices forming a network for the building. A first wireless bridge device of the wireless bridge devices includes a radio, a wired communications interface configured to communicate with a first master slave/token passing (MS/TP) device connected to the first wireless bridge device, and a processing circuit configured to provide a temporary reply to a request from the first MS/TP device to a second MS/TP device in wired communication with a second wireless bridge of the wireless bridge devices. The processing circuit is configured to pass a token on behalf of the second MS/TP device, and the processing circuit is configured to provide a first reply to the request from the second MS/TP device received via the second bridge device to the first MS/TP device when a token for the second MS/TP device is obtained.

One implementation of the present disclosure is related to a method. The method includes providing a request from a first building automation and control network (BACnet) device via wired communication on a first BACnet network to a first bridge device. The request is for a second BACnet device in wired communication with a second bridge device. The method also includes passing a token on behalf of the second BACnet device by the first bridge device to the first BACnet network, receiving a reply to the request at the second bridge device from the second BACnet device, and providing the reply from the second bridge device to the first bridge device via wireless communications. The method also includes providing the reply to the first BACnet device via wired communication on the first BACnet network from the first bridge device when a token for the second BACnet device is obtained.

One implementation of the present disclosure is related to a bridge device for a building network. The bridge device includes a radio, a wired communications interface configured to communicate with a first master slave/token passing (MS/TP) network, and a processing circuit configured to wirelessly transmit and receive messages to and from MS/TP devices coupled to the MS/TP network. The processing circuit is configured to transparently communicate the messages such that the MS/TP devices on the first MS/TP network are operationally unaware of a wireless network associated with the bridge device by passing tokens for MS/TP devices outside of the MS/TP network.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a wireless interface or bridge device is used by building equipment connected to wired building networks to exchange data according to various exemplary embodiments. In many buildings, building equipment is connected together in addition to being connected to external networks that may provide centralized services when the building equipment is being installed, tested, or used. In some embodiments, a wireless bridge for BACnet master slave/token passing (MS/TP) network is provided that addresses challenges associated with BACnet communications due to the multi-master configuration and stricter timing constraints of BACnet networks. In some embodiments, a wireless bridge or interface allows a wireless network to be used as a seamless replacement for some or all of physical wiring between MS/TP devices on a BACnet MS/TP network. In some embodiments, a wireless bridge system bridges segments of an MS/TP bus transparently such that MS/TP devices are operationally unaware of the wireless system. In some embodiments, each wireless bridge device forwards messages received on its local MS/TP interface to the appropriate destination via the wireless network and forwards BACnet messages received from other wireless bridge devices to applicable local MS/TP devices. In some embodiments, the wireless bridge device automatically detects MS/TP devices on its bus and notifies other wireless bridge devices on its network. Automatically detecting MS/TP devices and assigning wireless addresses allows MS/TP devices to be operationally unaware in some embodiments.

The wired networks (e.g., BACnet slave/token passing (MS/TP)) networks can achieve connectivity across building assets in some embodiments. The connectivity may include equipment-to-equipment connectivity, equipment-to-the cloud connectivity, mobile device to the cloud, and mobile devices-to-equipment in the building. Equipment-to-equipment connectivity may be necessary since during installation, equipment may need to communicate with each other to verify proper operation before network infrastructure of a building is in place. Equipment-to-the cloud connectivity may be necessary since equipment may need to be connected to the cloud to perform optimized service operations or other operations (e.g., remote configuration, remote status reporting, receiving remote control operations, cloud service testing, access diagnostic tools, device authentication for equipment to cloud operations, etc.).

Building Management System and HVAC System

Figure 1:
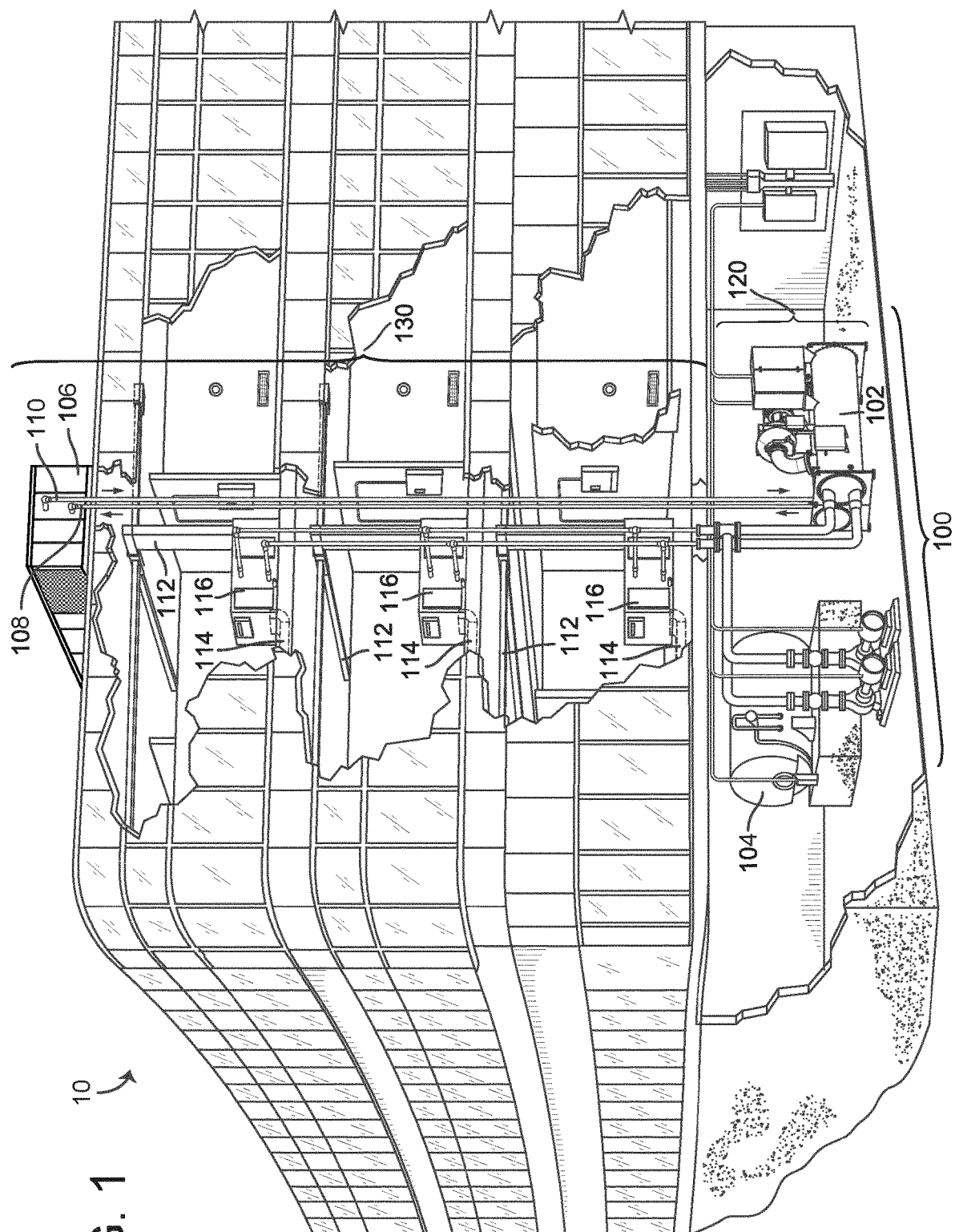
FIG. 1 is a drawing of a building equipped with a HVAC system, according to an exemplary embodiment.
Figure 2:
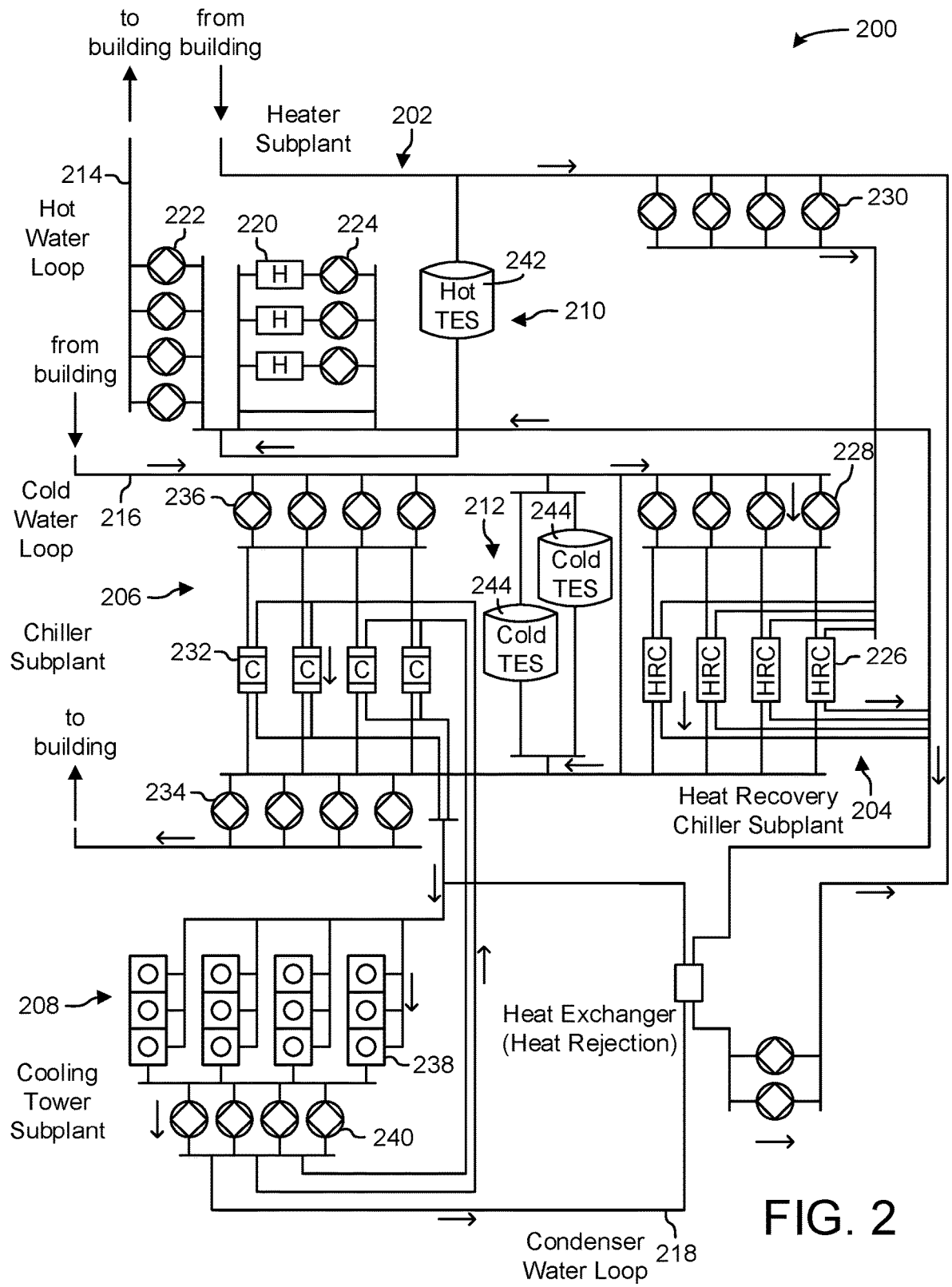
FIG. 2 is a block diagram of a waterside system that may be used in conjunction with the building of FIG. 1, according to an exemplary embodiment.
Figure 3:
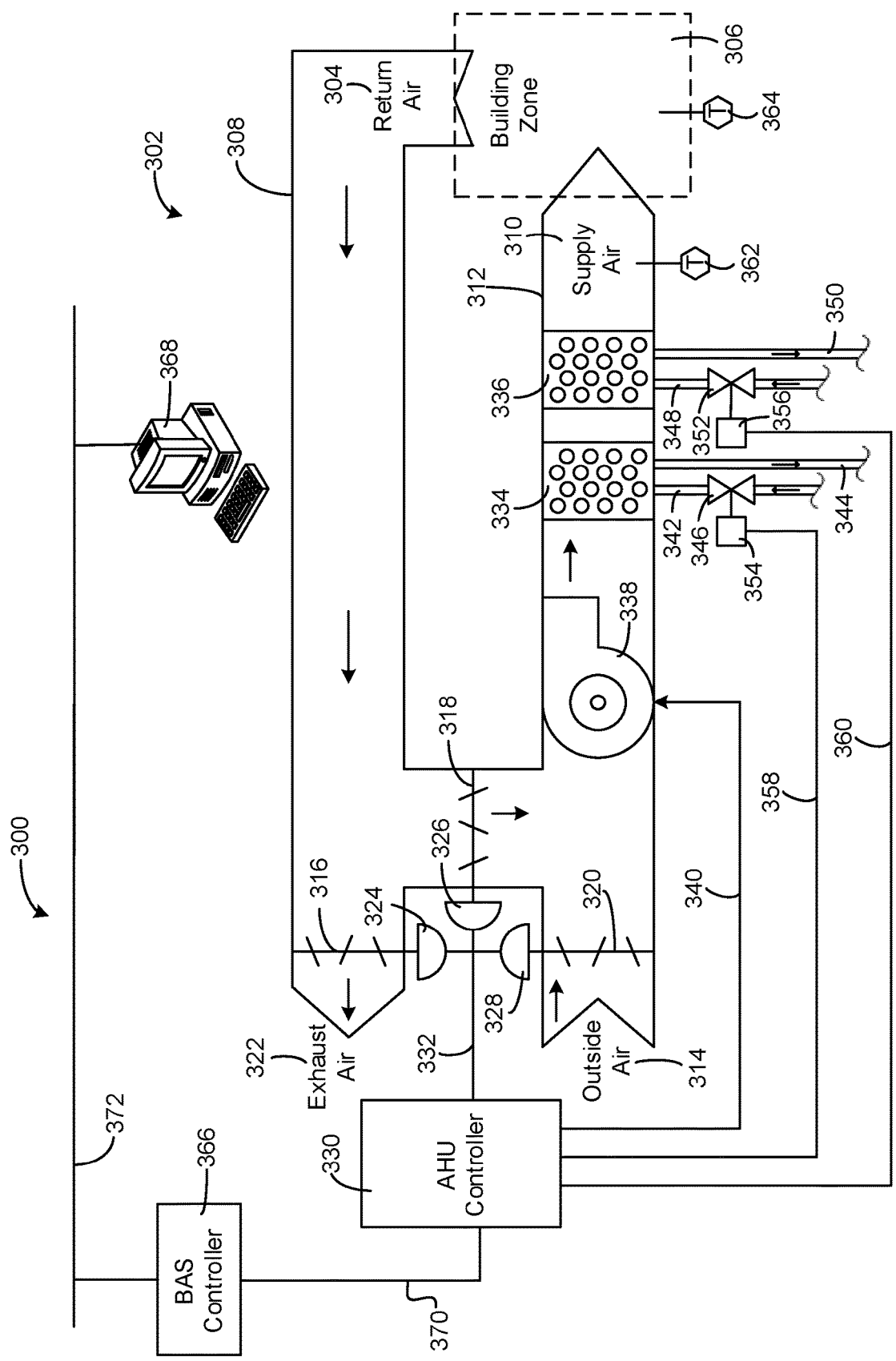
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., thermostats, sensors, controllers, heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Wireless Network

Some embodiments relate to a system for and method of providing a wireless bridge system for a building, such as the building 10 (FIG. 1) which bridges segments of a wired bus transparently such that MS/TP devices are operationally un-aware of the wireless system. In some embodiments, each wireless bridge device forwards messages received on its local wired interface (e.g., MS/TP interface) to the appropriate destination via the wireless network, when applicable. In some embodiments, each wireless bridge device forwards BACnet messages received from other wireless bridge devices to applicable local MS/TP devices, when applicable.

In some embodiments, the wireless bridge device automatically detects MS/TP devices on its bus and notifies other wireless bridge devices on its network. In some embodiments, the wireless bridge device optimizes MS/TP throughput by proxying multiple MS/TP devices with a single token. In some embodiments, the MS/TP tokens are maintained independently on each wired MS/TP network segment. In some embodiments, the wireless bridge device simulates an MS/TP token on behalf of each MS/TP device available over the wireless bridge device. In some embodiments, the wireless bridge device optionally postpones responses on behalf of an MS/TP device based on latency. In some embodiments, a mesh network is formed and each mesh node is equivalent for minimal configuration.

Figure 4:
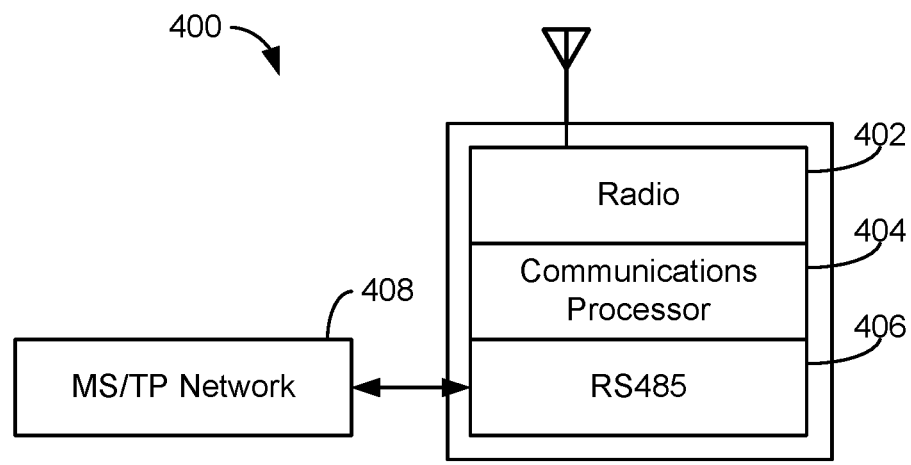
FIG. 4 is a block diagram of bridge device for use in a network in the building of FIG. 1, according to an exemplary embodiment.

Referring now to FIG. 4, a building system, such as a building system including one or more of the components discussed in FIGS. 1-3, can include a bridge device 400. Bridge device 400 includes a radio 402, a communications processor 404 and a wired interface 406. Bridge device 400 is coupled to a wired network 408, such as, an MS/TP network (e.g., BACnet MS/TP network).

Wired interface 406 is a communication interface (e.g., including a RS-485 interface) in some embodiments. Wired interface 406 includes a RS-485 serial port for communication with the wired network 408 (e.g., a BACnet MS/TP network). The wired network 408 can be coupled with wired devices, such as HAVC devices, lighting devices, security devices, etc. In some embodiments, the wired network 408 is coupled to building devices associated with a BMS.

Radio 402 is a wireless network radio for communication with other wireless bridge devices in some embodiments. The wireless bridge devices form a wireless network in some embodiments. Depending on the radio technology in the wireless bridge device, the wireless network can be a Zigbee network using an 802.15.4 radio, WiFi network using an 802.11 radio, a Bluetooth mesh network, Wi-Fi (star, mesh, Direct) network, etc. The radio 402 can configured to communicate with a mesh network via Wi-Fi, ZigBee (e.g., ZigBee IP, ZigBee Pro Green Power), Bluetooth, LoRa, a local area network (LAN), a metropolitan area network (MAN), a wide area network (WAN) (e.g., the Internet), ad hoc wireless communication (e.g., MANET, VANET, SPANET, iMANET), and/or any other type of wireless communication. In some embodiments, each wireless bridge device, such as bridge device 400, is connected to the MS/TP port of an MS/TP device (controller, actuator, sensor, lighting devices, security devices, any HVAC device discussed above, etc.) or directly to a segment of a wired network 408 (e.g., an MS/TP wired network) via the wired interface 406.

The communications processor 404 executes firmware and coordinate reception and transmission of BACnet messages to and from the wired interface 406. In some embodiments, the communications processor 404 of bridge device 400 automatically discovers the MS/TP devices that are present on the MS/TP network segment (e.g., MS/TP network or wired network 408) and shares that information with other wireless bridge devices so that the other bridge devices know to which wireless bridge device messages destined for those MS/TP devices should be forwarded. The communications processor 404 and other bridge devices maintain proper timing and token passing on the MS/TP network.

The communications processor 404 can include memory according to some embodiments. The communications processor 404 executes firmware stored in memory and performs or supervises media access control (MAC) layer and physical layer operations. The communications processor 404 receives BACnet messages from the wired interface 406. In some embodiments, the communications processor 404 of bridge device 400 uses software to automatically discover the MS/TP devices that are present on the MS/TP network segment (e.g., wired network 408) and shares that information with other wireless bridge devices so that the other bridge devices know to which wireless bridge device messages destined for those MS/TP devices should be forwarded. Automatic discovery can be achieved by monitoring the token on the network 408 or bus to determine which devices are actually communicating and using the token in some embodiments. In some embodiments, automatic discovery can be achieved by inspecting the messages that are being communicated on the wired network 408 or bus to discover messages and addresses. For example, if a device is present and receives a message on the wired side, the bridge device 400 determines the address is present on the wired network 408 and vice versa for the wireless side. Automatic discovery is performed in the media access control (MAC) layer of the wireless device 400 in some embodiments.

Communications processor 404 can be configured to perform some and/or all of the functionality of bridge device 400. In some embodiments, communications processor 404 is configured to perform some or all of the functionality necessary for connecting to mesh, point to point, or star networks and for transmitting information to and from the mesh, point to point, or star network. In some embodiments, communications processor 404 is configured to perform the functionality necessary to operate as an access point and to transfer information between wired network 408 and radio 402. Processor 404 can be a general purpose or specific purpose processor, an application specific integrated circuit (ASIC), one or more field programmable gate arrays (FPGAs), a group of processing components, or other suitable processing components. Processor 404 may be configured to execute computer code and/or instructions stored in memory or received from other computer readable media (e.g., CDROM, network storage, a remote server, etc.). In some embodiments, the memory stores a Linux operating system, the Linux operating system can facilitate some and/or all of the functionality of the components of the memory. The memory can include one or more devices (e.g., memory units, memory devices, storage devices, etc.) for storing data and/or computer code for completing and/or facilitating the various processes described in the present disclosure. In some embodiments, the memory stores data and/or computer code for completing and/or facilitating the various processes relevant to the operation of communications. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures for bridge device 400.

The bridge device 400 can use standards such as IEEE 802.11s or any variation of IEEE 802.11s to implement a mesh network between bridge devices. The bridge device 400 can utilize stored information (e.g., stored and/or shared information) regarding the links between various network devices to determine the most efficient path in the mesh network to forward data.

Bridge device 400 can be configured to establish links with other bridge devices for the purpose of being able to forward data packets on each other's behalf. Forwarding packets allows for data at one bridge device to be passed from bridge device to bridge device to reach its destination on another device on MS/TP network or wired network 408, or the Internet, even when the source and destination devices are not in direct range of each other.

Figure 5:
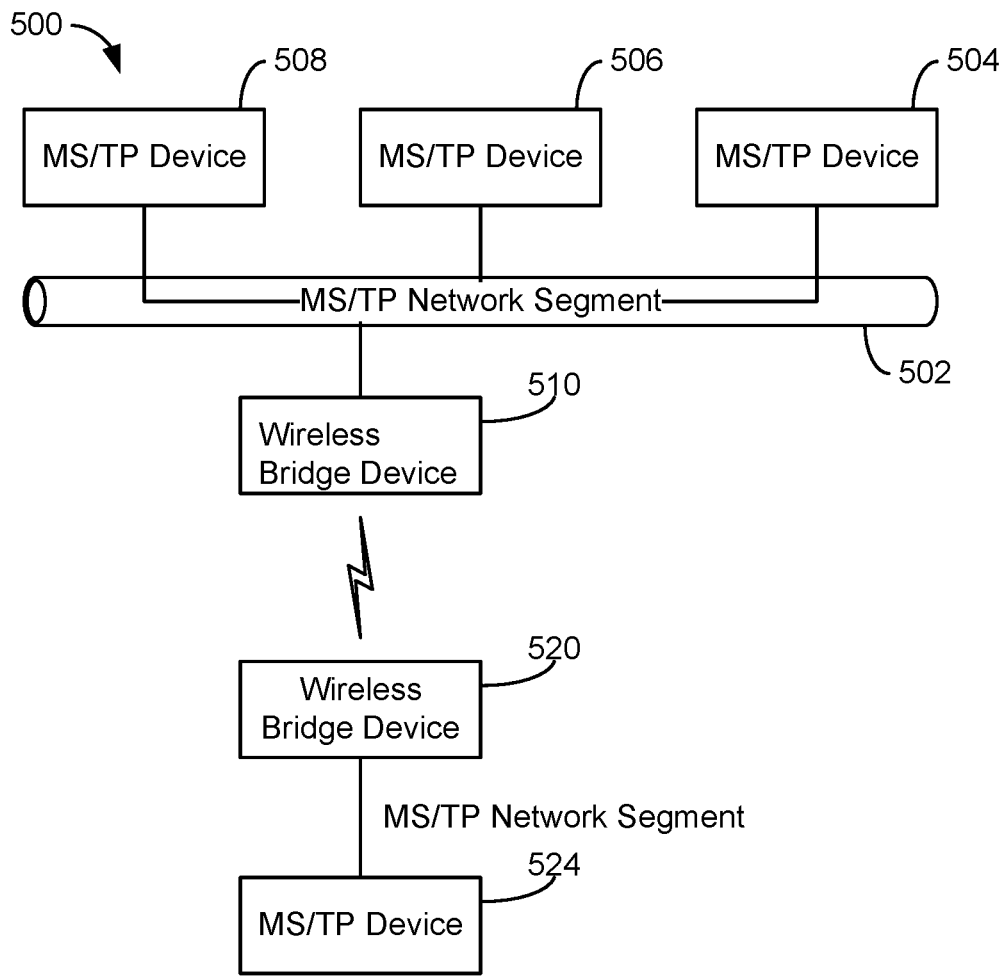
FIG. 5 is a block diagram of a point to point network in the building of FIG. 1, according to an exemplary embodiment.

With reference to FIG. 5, a network 500 includes a bridge device 510, a bridge device 520, an MS/TP device 524, an MS/TP network segment 502, and MS/TP devices 504, 506, and 508. Bridge devices 510 and 520 are similar to bridge device 410. MS/TP network segment 502 is similar to wired network 408. In some embodiments, network 500 is a point to point network with bridge devices 510 and 520 communicating wirelessly with each other. Bridge device 510 communicates via wired communications via MS/TP network segment 502 with devices 504, 506, and 508. Bridge device 520 can be coupled via a wired connection directly to device 524 or via a MS/TP network segment similar to segment 502.

Figure 6:
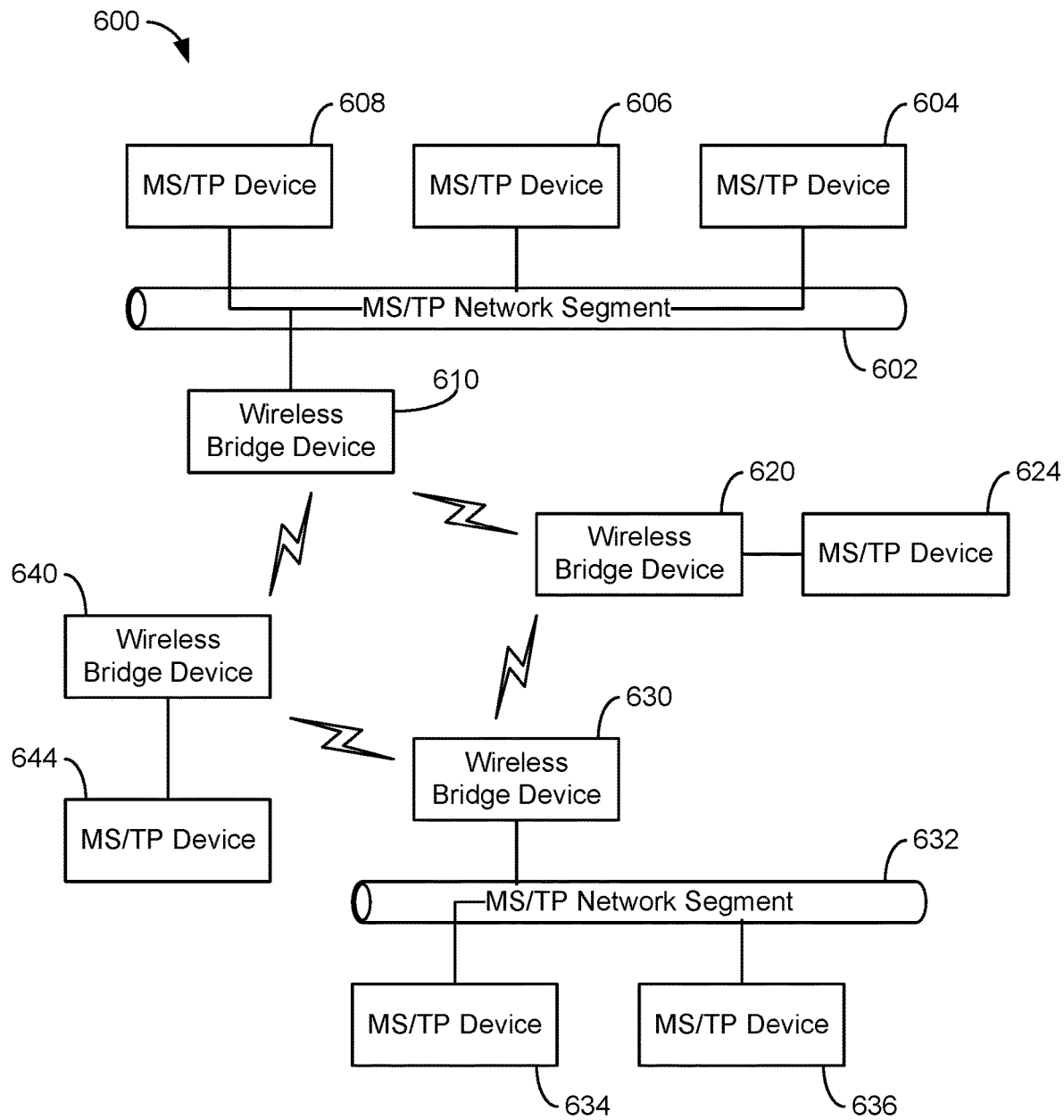
FIG. 6 is a block diagram of a mesh network in the building of FIG. 1, according to an exemplary embodiment.

With reference to FIG. 6, a network 600 includes a bridge device 610, a bridge device 620, a bridge device 530, a bridge device 640, an MS/TP network segment 602, an MS/TP network segment 632 and MS/TP devices 604, 606, 608, 624, 624, 636 and 644. Bridge devices 610, 620, 630, and 640 are similar to bridge device 410. MS/TP network segments 602 and 632 are similar to wired network 408. In some embodiments, network 600 is a mesh network with bridge devices 610, 620, 630, and 640 communicating wirelessly with each other. Bridge device 610 communicates via wired communications via MS/TP network segment 602 with devices 604, 606, and 608. Bridge device 630 communicates via wired communications via MS/TP network segment 632 with devices 634 and 636. Bridge device 620 can be coupled via a wired connection directly to device 624 or via a MS/TP network segment similar to segment 602. Bridge device 640 can be coupled via a wired connection directly to MS/TP device 644 or via a MS/TP network segment similar to segment 602.

Figure 7:
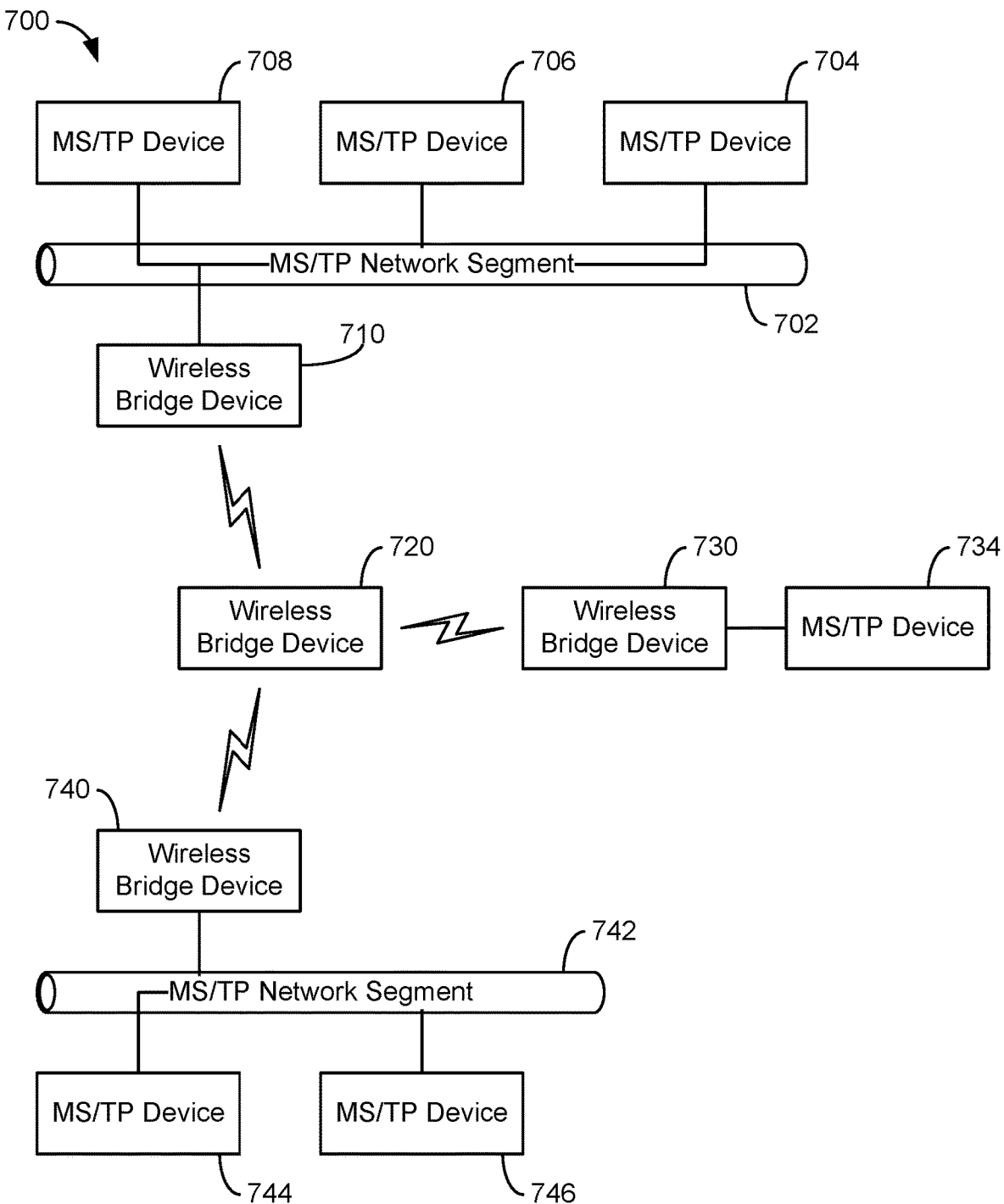
FIG. 7 is a block diagram of a star network in the building of FIG. 1, according to an exemplary embodiment.

With reference to FIG. 7, a network 700 includes a bridge device 710, a bridge device 720, a bridge device 730, a bridge device 740, an MS/TP network segment 702, an MS/TP network segment 642 and MS/TP devices 704, 706, 708, 734, 7444, and 646. Bridge devices 710, 720, 730, and 740 are similar to bridge device 410. MS/TP network segments 702 and 742 are is similar to wired network 408. In some embodiments, network 700 is a star network with bridge devices 710, 730, and 740 communicating wirelessly with each other via bridge device 720. Bridge device 710 communicates via wired communications via MS/TP network segment 702 with devices 704, 706, and 708. Bridge device 740 communicates via wired communications via MS/TP network segment 742 with devices 734, and 736. Bridge device 730 can be coupled via a wired connection directly to device 734 or via a MS/TP network segment similar to segment 702.

In some embodiments, bridge device 720 is a repeater on a mesh network as opposed to a hub/access-point on a star network. In the mesh network, bridge devices 710, 730, and 740 communicating wirelessly with each other via bridge device 720 configured as a repeater. In the mesh network, bridge device 710 communicates via wired communications via MS/TP network segment 702 with devices 704, 706, and 708. Bridge device 740 communicates via wired communications via MS/TP network segment 742 with devices 744, and 746. Bridge device 730 can be coupled via a wired connection directly to device 734 or via a MS/TP network segment similar to segment 702.

Figure 8:
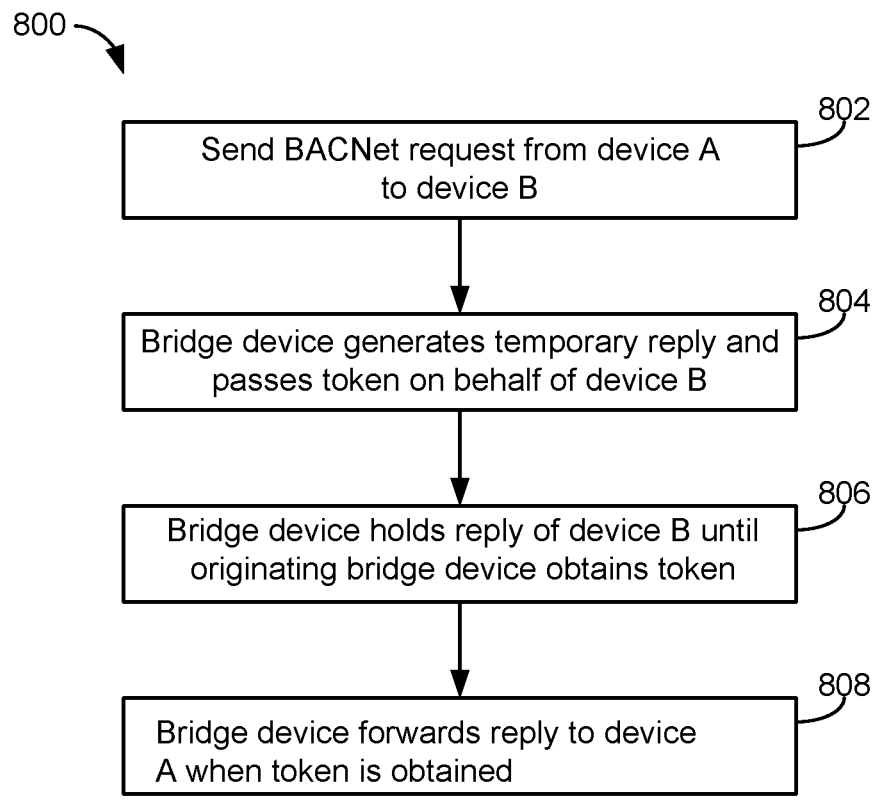
FIG. 8 is a flow diagram showing communication in the mesh network of FIG. 6, according to an exemplary embodiment.

With reference to FIGS. 6 and 8, a flow 800 can be performed in network 600. Flow 800 can also be performed in networks 600 and 700. When an MS/TP device (A) (e.g., device 634) sends a BACnet message (e.g., a request) to another MS/TP device (B) (e.g., device 604), the request is forwarded over the wireless mesh network using bridges 610, 620, and 630 or bridges 610, 640, and 630 in an operation 802. The bridge device 630 may generate a temporary message, such as a temporary reply on behalf of device B to maintain timing on the MS/TP network segment 632 while the message is forwarded through the wireless network to device B in an operation 804. The temporary reply is used when a link will take too long. In such a circumstance, the bridge device 630 sends the temporary reply as a postpone message that indicates a delay and that the device 634 can perform another operation or pass the token in some embodiments. The use of the postpone message prevents unnecessary network recovery steps due to delays caused by wireless transmissions. In operation 804, the request is wrapped in a wireless package for wireless transmission by the bridge device 630. The receiving bridge device 610 unwraps the wireless message and provides the request to the device 604 in the wired format. In some embodiments, the bridge device 630 inspects the message tp determine if the message is a request and a reply is necessary. In some embodiments, the wireless network is fast enough to meet the timing requirements of the MS/TP network segment 632, the token is not passed.

Once device B (e.g., device 634) replies, the reply is held at the original wireless bridge device (bridge device 630) until the token for device B is obtained in an operation 806. The reply is wrapped in a wireless message and unwrapped for the wired format by the bridge device 610. When the token for device B is obtained, the bridge device 630 forwards the reply to device A on the MS/TP network segment 632.

Due to this proper maintenance of the MS/TP timing and token passing in flow 800, no changes are needed on the MS/TP devices A and B to support the wireless bridging protocol in some embodiments. The protocol is transparent to the MS/TP devices 604, 606, 608, 624, 624, 636 and 644 and can advantageously be used in new networks as well as existing networks and extensions thereof without any changes to the existing MS/TP devices 604, 606, 608, 624, 624, 636 and 644. The protocol and network structure of networks 500, 600 and 700 also allows for less costly repairs of a network that has been damaged due to the potentially time-consuming search for damaged communication cable and/or the need to install replacement communication cable.

In some embodiments, the bridge device 600 simulates an MS/TP token on behalf of each MS/TP device 604, 606, 608, 624, 624, 636 and 644 available over the bridge device 600. In some embodiments, the wireless bridge device will optionally postpone responses on behalf of an MS/TP device based on latency. In some embodiments, the bridge device 600 includes queue that stores replies or other communications in the queue and provides the replies or other communications when a token is obtained. The queue can maintain the order of the communications.

The wireless connection in networks 500, 600, and 700 can be automatically formed in point to point, mesh or star topologies. For example, the bridge devices in 500, 600, and 700 can be configured to automatically form a mesh network. The mesh network can be a Wi-Fi mesh network, a ZigBee mesh network, a LoRa mesh network, and/or any other mesh network or combination thereof. The number of MS/TP devices (e.g., devices 604, 606, 608, 624, 624, 636 and 644), network segments (e.g., segments 602 and 632), and bridge devices (e.g., bridge devices 510, 520, 610, 620, 630, 640, 710, 720, 730, and 740) shown in the Figures are exemplary only and additional or fewer components can be utilized. In some embodiments, each network segment 502, 602, 632 702, and 742 has its own token. Networks 500, 600, and 700 are configured for multipoint to multipoint communications in some embodiments. In some embodiments, the bridge devices 510, 520, 610, 620, 630, 640, 710, 720, 730, and 740 are configured for multipoint to multipoint communications in a multipoint to multipoint capable network. In some embodiments, networks 500, 600, and 700 are configured for master-to-master communications (e.g., through bridge devices 510, 520, 610, 620, 630, 640, 710, 720, 730, and 740).

Devices 604, 606, 608, 624, 624, 636 and 644 as well as the devices in networks 500 and 700 may be any kind of HVAC, security, and/or fire prevention device and/or system. In some embodiments, building equipment on the wired network 408 is one and/or a combination of AHU 106, VAVs 116, boiler 104, chiller 102, thermostats, controllers, sensors, actuators, valves, and/or any other building HVAC device. In some embodiments, devices 604, 606, 608, 624, 624, 636 and 644 can be HVAC controllers, sensors, thermostats, fire detectors, fire panels, security cameras, security panels, and/or any other pieces of building equipment.

Each of devices 604, 606, 608, 624, 624, 636 and 644 may include sub-components which perform different functions, according to some embodiments. Various configurations and numeration of the different devices 604, 606, 608, 624, 624, 636 and 644 are possible according to some embodiments. In some embodiments, for example, all of the 604, 606, 608, 624, 624, 636 and 644 may be environmental controller devices configured to transmit information between other environmental controller devices via bridge devices 610, 620, 620 and 640.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building network system for a building, the system comprising:
   a plurality of wireless bridge devices forming a multi-point-to-multi-point network for the building, a first wireless bridge device of the plurality of wireless bridge devices comprising:

a radio;

a wired communications interface configured to communicate with a first building automation control network master slave/token passing (BACnet MS/TP) device connected to the first wireless bridge device; and a processing circuit configured to provide wireless communications to and from the first BACnet MS/TP device and a second BACnet MS/TP device such that the first BACnet MS/TP device and the second BACnet MS/TP device are operationally unaware of the wireless communications, wherein the processing circuit is configured to provide a temporary reply to a request from the first BACnet MS/TP device to the second BACnet MS/TP device in wired communication with a second wireless bridge of the plurality of wireless bridge devices based upon latency to maintain timing on an MS/TP network associated with the first BACnet MS/TP device, wherein the processing circuit is configured to maintain a token if a wireless network for the wireless communications is fast enough to meet timing requirements of the second BACnet MS/TP device and pass the token on behalf of the second BACnet MS/TP device if the wireless network for the wireless communications is not fast enough to meet the timing requirements.

2. The building network system of claim 1, wherein at least one of the plurality of wireless bridge devices is configured to be a wireless repeater meant to extend a range of the wireless network.

3. The building network system of claim 1, wherein the plurality of wireless bridge devices are configured to form a mesh network.

4. The building network system of claim 1, wherein the plurality of wireless bridge devices are configured as an 802.15.4 network.

5. The building network system of claim 1, wherein the processing circuit is configured to detect automatically BACnet MS/TP devices on a network segment coupled to the first wireless bridge device and notifies other bridge devices of the detected BACnet MS/TP devices.

6. The building network system of claim 1, wherein the plurality of wireless bridge devices are configured as an 802.11 network.

7. The building network system of claim 1, wherein the first BACnet MS/TP device or the second BACnet MS/TP device include an HVAC controller.

8. The building network system of claim 1, wherein the plurality of wireless bridge devices are configured to form a star network.

9. The building network system of claim 1, wherein the wireless communications are master-to-slave communications.

10. The building network system of claim 1, wherein the wireless communications are master-to-master communications.

11. A building network system for a building, the system comprising:

a plurality of wireless bridge devices forming a multi-point-to-multi-point network for the building, a first wireless bridge device of the plurality of wireless bridge devices comprising:

a radio;

a wired communications interface configured to communicate with a first building automation control network master slave/token passing (BACnet MS/TP) device connected to the first wireless bridge device; and a processing circuit configured to provide wireless communications to and from the first BACnet MS/TP device and a second BACnet MS/TP device such that the first BACnet MS/TP device and the second BACnet MS/TP device are operationally unaware of the wireless communications, wherein the processing circuit is configured to provide a temporary reply to a request from the first BACnet MS/TP device based upon latency and to pass a token on behalf of the second BACnet MS/TP device to maintain timing on an MS/TP network associated with the first BACnet MS/TP device if a wireless network for the wireless communications is not fast enough to meet timing requirements of the second BACnet MS/TP device.

12. The building network system of claim 11, wherein the temporary reply is a postpone message indicating a delay.

13. The building network system of claim 11, wherein the plurality of wireless bridge devices are configured as an 802.15.4 network.

14. The building network system of claim 11, wherein the processing circuit is configured to detect automatically BACnet MS/TP devices on a network segment coupled to the first wireless bridge device and notifies other bridge devices of the detected BACnet MS/TP devices.

15. The building network system of claim 11, wherein the plurality of wireless bridge devices are configured as an 802.11 network.

16. A method, comprising:

providing a first message from a first building automation and control network master slave token passing (BACnet MS/TP) device via wired communication on a first BACnet network segment to a first wireless bridge device, the first message being for a second BACnet MS/TP device in wired communication with a second wireless bridge device, the first wireless bridge device and the second wireless bridge device being part of a multi-point-to-multi-point network;

providing the first message from the first wireless bridge device to the second wireless bridge device via direct or indirect wireless communication on a wireless network;

providing the first message from the second wireless bridge device to the second BACnet MS/TP device, wherein the first BACnet MS/TP device and the second BACnet MS/TP device are operationally unaware of the direct or indirect wireless communications, wherein the first wireless bridge device analyzes the first message and, if the first message is a request, provides a temporary reply message to the request from the first BACnet MS/TP device on behalf of the second BACnet MS/TP device to maintain timing on an MS/TP network associated with the first BACnet MS/TP device based upon latency; and passing, by the first wireless bridge device, a token on behalf of the second BACnet MS/TP device if the wireless network for the direct or indirect wireless communications is not fast enough to meet timing requirements of the second BACnet MS/TP device.

17. A method, comprising:
providing a first message from a first building automation and control network master slave token passing (BACnet MS/TP) device via wired communication on a first BACnet network segment to a first wireless bridge device, the first message being for a second BACnet MS/TP device in wired communication with a second wireless bridge device, the first wireless bridge device and the second wireless bridge device being part of a multi-point-to-multi-point network;
providing the first message from the first wireless bridge device to the second wireless bridge device via direct or indirect wireless communication;
providing the first message from the second wireless bridge device to the second BACnet MS/TP device, wherein the first BACnet MS/TP device and the second BACnet MS/TP device are operationally unaware of the direct or indirect wireless communication; and
passing a token on behalf of the second BACnet MS/TP device by the first wireless bridge device to the first BACnet network segment if a wireless network for the direct or indirect wireless communication is not fast enough to meet timing requirements of the second BACnet MS/TP device.

18. The method of claim 17, further comprising:
wherein the first wireless bridge device analyzes the first message and, if the first message is a request, provides a temporary reply message to the request from the first BACnet MS/TP device on behalf of the second BACnet MS/TP device to maintain timing on an MS/TP network associated with the first BACnet MS/TP device.

19. The method of claim 17, further comprising:
automatically detecting BACnet MS/TP devices on the first BACnet MS/TP network segment coupled to at least one of the first wireless bridge device or the second wireless bridge device.

20. The method of claim 19, further comprising:
notifying other bridge devices of the detected BACnet MS/TP devices.

* * * * *